(12) United States Patent
Hunt et al.

(10) Patent No.: US 8,074,231 B2
(45) Date of Patent: Dec. 6, 2011

(54) CONFIGURATION OF ISOLATED EXTENSIONS AND DEVICE DRIVERS

(75) Inventors: Galen C. Hunt, Bellevue, WA (US); James R. Larus, Mercer Island, WA (US); Manuel A Fähndrich, Seattle, WA (US); Orion Hodson, Redmond, WA (US); David R. Tarditi, Kirkland, WA (US); Michael Spear, Rochester, NY (US); Michael Carbin, Fremont, CA (US); Steven P. Levi, Redmond, WA (US); Bjame Steensgaard, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1030 days.

(21) Appl. No.: 11/428,096

(22) Filed: Jun. 30, 2006

(65) Prior Publication Data
US 2007/0094673 A1 Apr. 26, 2007

Related U.S. Application Data

(60) Provisional application No. 60/730,546, filed on Oct. 26, 2005.

(51) Int. Cl.
G06F 3/00 (2006.01)
G06F 9/44 (2006.01)
G06F 9/46 (2006.01)
G06F 13/00 (2006.01)
(52) U.S. Cl. ....................................................... 719/321
(58) Field of Classification Search .................... 719/321
See application file for complete search history.

(56) References Cited

U.S. PATENT DOCUMENTS

| | | | |
|---|---|---|---|
| 4,885,684 A | 12/1989 | Austin et al. | |
| 4,916,637 A | 4/1990 | Allen et al. | |
| 5,031,089 A | 7/1991 | Liu et al. | |
| 5,057,996 A | 10/1991 | Cutler et al. | |
| 5,179,702 A | 1/1993 | Spix et al. | |
| 5,317,568 A | 5/1994 | Bixby et al. | |
| 5,329,619 A | 7/1994 | Page et al. | |
| 5,339,443 A | 8/1994 | Lockwood | |
| 5,349,682 A | 9/1994 | Rosenberry | |
| 5,361,359 A | 11/1994 | Tajalli et al. | |

(Continued)

FOREIGN PATENT DOCUMENTS

CN 1549108 A 11/2004

(Continued)

OTHER PUBLICATIONS

Fraim et al, "Scomp: A Solution to the Multilevel Security Problem", 1983, pp. 26-34.*

(Continued)

*Primary Examiner* — Andy Ho
*Assistant Examiner* — Timothy A Mudrick
(74) *Attorney, Agent, or Firm* — Lee & Hayes, PLLC

(57) ABSTRACT

In some implementations, the operations of a software system may include the execution of untrusted device drivers. The execution of an untrusted device driver may be initiated when an untrusted device driver that is a set of executable instructions is obtained. A computing resource for the execution of the device driver may be further determined from a device-driver manifest of the untrusted device driver. Computing resources may include one or more of a hardware resource, a memory, an input/output port, an interrupt request line, and an inter-process communication channel. Trusted local access objects may be used by the untrusted device driver to access the computing resources.

13 Claims, 4 Drawing Sheets

U.S. PATENT DOCUMENTS

| | | | |
|---|---|---|---|
| 5,367,681 A | 11/1994 | Foss et al. | |
| 5,455,951 A | 10/1995 | Bolton et al. | |
| 5,469,571 A | 11/1995 | Bunnell | |
| 5,481,717 A | 1/1996 | Gaboury | |
| 5,522,075 A | 5/1996 | Robinson et al. | |
| 5,551,051 A | 8/1996 | Silverthorn et al. | |
| 5,574,911 A * | 11/1996 | D'Angelo et al. | 707/1 |
| 5,590,001 A | 12/1996 | Ino et al. | |
| 5,590,281 A | 12/1996 | Stevens | |
| 5,666,519 A | 9/1997 | Hayden | |
| 5,694,601 A | 12/1997 | White | |
| 5,737,605 A | 4/1998 | Cunningham et al. | |
| 5,752,032 A | 5/1998 | Keller et al. | |
| 5,768,532 A | 6/1998 | Megerian | |
| 5,794,052 A | 8/1998 | Harding | |
| 5,845,129 A | 12/1998 | Wendorf et al. | |
| 5,857,195 A | 1/1999 | Hayashi et al. | |
| 5,878,408 A | 3/1999 | Van Huben et al. | |
| 5,923,878 A | 7/1999 | Marsland | |
| 5,931,938 A | 8/1999 | Drogichen et al. | |
| 5,938,723 A | 8/1999 | Hales, II et al. | |
| 5,958,050 A * | 9/1999 | Griffin et al. | 726/1 |
| 5,963,743 A | 10/1999 | Amberg et al. | |
| 5,974,572 A | 10/1999 | Weinberg et al. | |
| 5,991,518 A | 11/1999 | Jardine et al. | |
| 6,003,129 A | 12/1999 | Song et al. | |
| 6,006,328 A | 12/1999 | Drake | |
| 6,009,476 A | 12/1999 | Flory et al. | |
| 6,038,399 A | 3/2000 | Fisher et al. | |
| 6,066,182 A | 5/2000 | Wilde et al. | |
| 6,072,953 A | 6/2000 | Cohen et al. | |
| 6,078,744 A | 6/2000 | Wolczko et al. | |
| 6,080,207 A | 6/2000 | Kroening et al. | |
| 6,092,189 A | 7/2000 | Fisher et al. | |
| 6,115,819 A * | 9/2000 | Anderson | 726/20 |
| 6,144,992 A | 11/2000 | Turpin et al. | |
| 6,157,928 A | 12/2000 | Sprenger et al. | |
| 6,161,051 A | 12/2000 | Hafemann et al. | |
| 6,182,275 B1 | 1/2001 | Beelitz et al. | |
| 6,202,147 B1 * | 3/2001 | Slaughter et al. | 713/1 |
| 6,247,128 B1 | 6/2001 | Fisher et al. | |
| 6,279,111 B1 | 8/2001 | Jensenworth et al. | |
| 6,292,941 B1 | 9/2001 | Jollands | |
| 6,321,334 B1 | 11/2001 | Jerger et al. | |
| 6,324,622 B1 | 11/2001 | Okpisz et al. | |
| 6,341,371 B1 | 1/2002 | Tandri | |
| 6,351,850 B1 | 2/2002 | van Gilluwe et al. | |
| 6,381,742 B2 | 4/2002 | Forbes et al. | |
| 6,405,361 B1 | 6/2002 | Broy et al. | |
| 6,434,694 B1 | 8/2002 | Slaughter et al. | |
| 6,438,549 B1 | 8/2002 | Aldred et al. | |
| 6,442,754 B1 | 8/2002 | Curtis | |
| 6,446,260 B1 | 9/2002 | Wilde et al. | |
| 6,487,723 B1 | 11/2002 | MacInnis | |
| 6,542,926 B2 | 4/2003 | Zalewski et al. | |
| 6,546,546 B1 | 4/2003 | Van Doorn | |
| 6,629,152 B2 | 9/2003 | Kingsbury et al. | |
| 6,658,447 B2 | 12/2003 | Cota-Robles | |
| 6,715,144 B2 | 3/2004 | Daynes et al. | |
| 6,732,220 B2 | 5/2004 | Babaian et al. | |
| 6,748,592 B1 | 6/2004 | Porter | |
| 6,816,905 B1 | 11/2004 | Sheets et al. | |
| 6,817,013 B2 | 11/2004 | Tabata et al. | |
| 6,842,782 B1 | 1/2005 | Malik et al. | |
| 6,868,539 B1 | 3/2005 | Travison et al. | |
| 6,912,692 B1 | 6/2005 | Pappas | |
| 6,944,754 B2 | 9/2005 | Zilles et al. | |
| 6,973,517 B1 | 12/2005 | Golden et al. | |
| 6,977,994 B2 | 12/2005 | Stephenson et al. | |
| 6,988,261 B2 | 1/2006 | Sokolov et al. | |
| 7,000,092 B2 | 2/2006 | Gehman et al. | |
| 7,062,764 B2 | 6/2006 | Cohen et al. | |
| 7,086,056 B2 | 8/2006 | Fukushima | |
| 7,089,289 B1 | 8/2006 | Blackmore et al. | |
| 7,155,713 B1 | 12/2006 | Burkhardt et al. | |
| 7,167,867 B1 | 1/2007 | Rago | |
| 7,222,106 B2 | 5/2007 | Block et al. | |
| 7,222,341 B2 | 5/2007 | Forbes et al. | |
| 7,278,030 B1 | 10/2007 | Chen et al. | |
| 7,451,435 B2 | 11/2008 | Hunt et al. | |
| 7,454,477 B2 | 11/2008 | Talluri et al. | |
| 7,484,245 B1 | 1/2009 | Friedman et al. | |
| 7,600,232 B2 | 10/2009 | Hunt et al. | |
| 7,694,300 B2 | 4/2010 | Hunt et al. | |
| 7,788,637 B2 | 8/2010 | Hunt et al. | |
| 7,882,317 B2 | 2/2011 | Hunt et al. | |
| 2001/0029605 A1 | 10/2001 | Forbes et al. | |
| 2002/0004852 A1 * | 1/2002 | Sadovsky et al. | 709/321 |
| 2002/0099954 A1 | 7/2002 | Kedma et al. | |
| 2002/0100017 A1 | 7/2002 | Grier et al. | |
| 2003/0031404 A1 | 2/2003 | Pedersen | |
| 2003/0056084 A1 | 3/2003 | Holgate et al. | |
| 2003/0061067 A1 | 3/2003 | Atwal et al. | |
| 2003/0061404 A1 | 3/2003 | Atwal et al. | |
| 2003/0084256 A1 | 5/2003 | McKee | |
| 2003/0097581 A1 | 5/2003 | Zimmer | |
| 2003/0130854 A1 | 7/2003 | Galanes et al. | |
| 2003/0191867 A1 | 10/2003 | Czajkowski | |
| 2003/0200402 A1 | 10/2003 | Willman et al. | |
| 2003/0212990 A1 | 11/2003 | Brodkorb et al. | |
| 2003/0221012 A1 | 11/2003 | Herrmann et al. | |
| 2003/0233644 A1 | 12/2003 | Cohen et al. | |
| 2004/0025016 A1 | 2/2004 | Focke et al. | |
| 2004/0034850 A1 | 2/2004 | Burkhardt et al. | |
| 2004/0061067 A1 | 4/2004 | Clauss | |
| 2004/0064736 A1 | 4/2004 | Obrecht et al. | |
| 2004/0078799 A1 | 4/2004 | Koning et al. | |
| 2004/0123273 A1 | 6/2004 | Hammerich et al. | |
| 2004/0153991 A1 * | 8/2004 | Chen et al. | 717/100 |
| 2004/0187096 A1 | 9/2004 | Dumont | |
| 2004/0193819 A1 | 9/2004 | Marinescu et al. | |
| 2004/0199763 A1 | 10/2004 | Freund | |
| 2004/0226023 A1 | 11/2004 | Tucker | |
| 2004/0236861 A1 | 11/2004 | Bondar et al. | |
| 2004/0268171 A1 | 12/2004 | Inoue et al. | |
| 2005/0005261 A1 | 1/2005 | Severin | |
| 2005/0021537 A1 | 1/2005 | Brendle et al. | |
| 2005/0050069 A1 | 3/2005 | Vaschillo et al. | |
| 2005/0060687 A1 | 3/2005 | Ghazaleh et al. | |
| 2005/0071592 A1 | 3/2005 | DeCaro | |
| 2005/0071828 A1 | 3/2005 | Brokenshire et al. | |
| 2005/0081181 A1 | 4/2005 | Brokenshire et al. | |
| 2005/0081203 A1 | 4/2005 | Aguilar, Jr. et al. | |
| 2005/0091658 A1 * | 4/2005 | Kavalam et al. | 718/104 |
| 2005/0119902 A1 | 6/2005 | Christiansen | |
| 2005/0125789 A1 | 6/2005 | Dijkstra et al. | |
| 2005/0188372 A1 | 8/2005 | Inoue et al. | |
| 2005/0203988 A1 | 9/2005 | Nollet et al. | |
| 2005/0223239 A1 * | 10/2005 | Dotan | 713/188 |
| 2005/0246718 A1 | 11/2005 | Erlingsson et al. | |
| 2006/0005082 A1 | 1/2006 | Fossum et al. | |
| 2006/0031815 A1 | 2/2006 | Bhagia et al. | |
| 2006/0047875 A1 | 3/2006 | Aguilar, Jr. et al. | |
| 2006/0069692 A1 | 3/2006 | Pernia | |
| 2006/0085789 A1 | 4/2006 | Laborczfalvi et al. | |
| 2006/0123401 A1 | 6/2006 | O'Brien et al. | |
| 2006/0123417 A1 | 6/2006 | Hunt et al. | |
| 2007/0011199 A1 | 1/2007 | Hunt et al. | |
| 2007/0033592 A1 | 2/2007 | Roediger et al. | |
| 2007/0043936 A1 | 2/2007 | Day et al. | |
| 2007/0061483 A1 | 3/2007 | Dauger | |
| 2007/0094495 A1 | 4/2007 | Hunt et al. | |
| 2007/0256080 A1 | 11/2007 | Smith et al. | |
| 2007/0283337 A1 | 12/2007 | Kasahara et al. | |
| 2008/0005750 A1 | 1/2008 | Hunt et al. | |
| 2008/0022278 A1 | 1/2008 | Gschwind et al. | |
| 2008/0244507 A1 | 10/2008 | Hodson et al. | |
| 2008/0244599 A1 | 10/2008 | Hodson et al. | |
| 2008/0250414 A1 | 10/2008 | Brokenshire et al. | |

FOREIGN PATENT DOCUMENTS

| | | |
|---|---|---|
| EP | 1033648 A2 | 9/2000 |
| EP | 1443398 A | 8/2004 |
| JP | 2002506247 | 2/2002 |
| JP | 2003233521 | 8/2003 |
| JP | 2004513412 | 4/2004 |
| KR | 20010007119 | 1/2001 |

| | | |
|---|---|---|
| RU | 2155373 C2 | 8/2000 |
| RU | 2307388 (C2) | 9/2007 |
| RU | 2337398 C2 | 10/2008 |
| WO | WO02093370 A | 11/2002 |
| WO | 03038599 A2 | 5/2003 |
| WO | WO03038599 A2 | 5/2003 |
| WO | WO2004025491 A1 | 3/2004 |
| WO | WO2004099949 A1 | 11/2004 |

OTHER PUBLICATIONS

Bogojevic, et al., "The Architecture of Massive Multiplayer Online Games", retrieved on Feb. 25, 2009 at <<http://graphics.cs.lth.se/theses/projects/mmogarch/som.pdf>>, Department of Computer Science, Lund University, Sep. 8, 2003, Chapter 4, 11 pages.

Mikunov A., "Rewrite MSiI Code on the Fly with the .NET Framework Profiling API", MSDN Magazine (Online) Sep. 2003, Retrieved from the Internet: URL: <<http://msdn.microsoft.com/en-us/magazine/cc188743(printer).aspx>> retrieved onDec. 12, 2008).

Watson, et al., "Design and implementation of the Trusted BSD MAC framework", Proceedings of 2003 DARPA Information Survivability Conference and Exposition, Sec. 1&5-7, Apr. 2003, pp. 38-49.

"The JX Operating System" Michael Golm, Meik Felser Christian Wawersich, and Juergen Kleinoeder 2002 USENIX Annual Technical Conference, Jun. 10-15, 2002, Monterey, CA, pp. 45-58.

"Trademark Electronic Search System (TESS) from the USPTO database" for "Windows" trademark of Microsoft filed in USPTO Aug. 20, 1999; http://tess2.uspto.gov/bin/gate.exe? f=doc &state=n00gan.5.26.

Microsoft Press Computer Dictionary, Second Edition, 1994, Published by Penguin Books, Ltd., pp. 23-24 and p. 279.

Microsoft Press Computer Dictionary Third Edition: 1997 3 pages.

Pike, et al, "The Use of Name Spaces in Plan 9", Operating Systems Review, vol. 27, #2, Apr. 1993, pp. 72-76.

Hunt et al: "Broad New OS Research: Challenges and Opportunities" Retrieved from the Internet: URL: http://research.microsoft.com/os/singularity/publications/hotos2005_broadnewreseach.pdf> [retrieved on Dec. 2, 2008].

Tatsubori et al: "Open Java: A Class-Based Macro System for Java" 2000 [Retrieved from the Internet: URL: http://www.springerlink.com/content/n64gdultayqfmcjc/fulltext.pdf> [retrieved on Dec. 2, 2008].

EP Search Report for European Patent Application No. 06817056.2, mailed on Dec. 12, 2008, 10 pages.

Acharya, et al., "MAPbox: Using Parameterized Behavior Classes to Confine Applications", University of California, Santa Barbara, May 1, 1999, pp. 1-19.

Kurchuk, et al., "Recursive Sandboxes: Extending Systrace to Empower Applications", retrieved on Sep. 4, 2009 at web.archive.org/web/20040725140723/http://nsl.cs.columbia.edu/projects/gridlock/systrace_extensions.pdf>>, 2004, pp. 1-16.

"Microsoft Computer Dictionary", retrieved on Sep. 4, 2009 at proquest.safaribooksonline.com/print?xmlid=0735614954/ch20>>, Fifth Edition, 2002, pp. 1-2.

Perrine, et al., "An Overview of the Kernelized Secure Operating System (KSOS)", Proceedings of the 7th DoD/NBS Computer Security Conference, 1984, pp. 0-14.

Perrine, "The Kernelized Secure Operating System (KSOS)", ;login: The Magazine of USENIX & SAGE, vol. 27, No. 6, 2002, pp. 36-40.

Provos, "Improving Host Security with System Call Policies", Proceedings of the 12th USENIX Security Symposium, USENIX Association, Aug. 2003, pp. 257-271.

"Variable Scope", retrieved on Sep. 4, 2009 at irc.essex.ac.uk/www.iota-six.co.uk/d/d5_variable_scope.asp>>, Scope, 2003, pp. 1-5.

Acceta et al.; "A New Kernel Foundation for UNIX Development", In Summer USENIX Conference, Atlanta, GA, Jun. 1986, pp. 93-112.

Back et al., "Processes in KaffeOS: Isolation, Resource Management, and Sharing in Java", Proceedings of the 4th Symposium on Operating Systems Design and Implementation (OSDI), USENIX Association, San Francisco, CA, Oct. 2000, pp. 333-346.

Chaki et al, "Types as Models: Model Checking Message-Passing Programs", Proceedings of the 29th ACM Symposium on Principles of Programing Lanuages, 2002, pp. 45-57.

Chiueh, et al., "Integrating segmentation and paging protection for safe, efficient and transparent software extensions", SOSP-17, ACM, Dec. 1999, pp. 140-153.

Dorward et al; "The Inferno Operating System"; Bell Labs Technical Journal, 2 (1), Winter 1997, pp. 5-18.

Engler et al.; "Exokernel: an Operating System Architecture for Application-Level Resource Management"; In Proceedings of the Fifteenth ACM Symposium on Operating System Principles, Cooper Mountain Resort, Co, 1995, pp. 251-266.

Goldberg et al.; "Smalltalk-80: The Language and Its Implementation"; Addison-Wesley, May 1983.

Golm et al., "Beyond Address Spaces—Flexibility, Preformance, Protection, and Resource Management in the Tpe-Safe JX Operatin System", Proc. of the 8th Workshop on Hot Topics in Operating Systems, May 2001, 6 pages.

Hartig et al.; "The Perfromance of u-kernel-based Systems"; In Proceedings of the Sixteenth ACM Symposium on Operating Systems Principles (SOSP '97), Saing Malo, France, 1997, pp. 66-77.

Hawblitzel et al.; "Implementing Multiple PRotection Domains in Java"; In Proceedings of the 1998 USENIX Annual Technical Conference, New Orleans, LA, Dec. 1998, pp. 259-270.

Hawblitzel et al.; "Luna: A Flexible Java Protection System"; In Proceedings of the Fifth ACM Symposium on Operating System Design and Implementation (OSDI'02), Boston, MA, 2002, pp. 391-402.

"JSR-000121 Application Isolation API Specification"; available at http://jcp.org/aboutJava/communityprocess/pfd/jsr121/index.html; printed Sep. 7, 2006, 1 page.

"JSR 121: Application Isolation API Specification" Java Specification Requests, printed Sep. 7, 2006, 7 pages.

Rajamani et al.; "Conformance Checking for Models of Asynchronous Message Passign Software"; In Proceedings of the International Conference on Computer Aided Verification (CAV 02), Springer, Copenhagen, Denmark, Jul. 2002, pp. 166-179.

Redell et al.; "Pilot: An Operating System for a Personal Computer"; Communications of the ACM, 23 (2), 1980, pp. 81-92.

Rosenblum et al.; "The Impact of Architectural Trends on Operating System Performance"; In Proceedings of the Fifteenth ACM Symposium on Operating System Principles, Copper Mountain Resort, CO, 1995, pp. 285-298.

Skousen, et al., "Resource Access and Protection in the Sombrero Protection Model, Software Protection Data Structures and Hardware Range Protection Lookaside Buffer", ASU 64-bit OS Group White Paper 2, Technical Report, TR-95-013, Jan. 1996, 35 pages.

Swift et al; "Improving the Reliability of Commodity Operating Systems"; In Proceedings of the 19th ACM Symposium on Operating Systems Principles (SOSP '03), Bolton Landing, NY, 2003, pp. 207-222.

Swinehart et al.; "A Structural View of the Cedar Programming Environment"; ACM Transactions on Programming Languages and Systems, 8 (4), 1986, pp. 419-490.

Wahbe et al.; "Efficient Software-Based FAult Isolation"; In Proceedings of the Fourteenth ACM Symposium on Operating System Principles, Asheville, NC, 1993, pp. 203-216.

Weinreb et al.; "Lisp Machine Manuel"; Symbolics, Inc., Cambridge, MA, Jul. 1981, 1 page.

Wood et al.; "An In-Cache Address Translation Mechanism"; In Proceedings of the Thirteenth Annual International Symposium on Computer Architecture, Jun. 1986, pp. 158-166.

Back et al., "Processes in KaffeOS: Isolation, Resource Management, and Sharing in Java", Proceedings of the 4th Symposium on Operating Systems Design and Implementation (OSDI), USENIX Association, San Francisco, CA, Oct. 2000, pp. 333-346.

Hunt et al., "Singularity Technical Report 1: Singularity Design Motivation", Microsoft Research, Dec. 17, 2004, MSF-TR-2004-105, 5 pages, retrieved at <<https://singularity.svn.codeplex.com/svn/docs/Technical%20Reports/STR1%20Singularity%20Design%20Motivationc%20(MSR-TR-2004-105).pdf>>.

McNamee et al., "An Attribute Grammar Approach to Compiler Optimization of Intra-Module Interprocess Communication", International Journal of Parallel Programming, vol. 20, Nov. 3, 1991, pp. 181-202.

Tanenbaum, "Modern Operating Systems, Second Edition, Chapter 3: Deadlocks", Prentice Hall Inc., 2001, pp. 168-175.

Tost, "Loosely typed versus strongly typed Web services", IBM, developerWorks, Sep. 2, 2005, 14 pages.

Gay et al., "Session Types for Inter-Process Communication", University of Glasgow, Department of Computing Science Technical Report (TR-2003-133), Mar. 2003, 33 pages.

Huang et al., "Securing Web Application Code by Static Analysis and Runtime Protection", Proceedings of the 13th International Conference on World Wide Web, ACM, New York, NY, 2004, 12 pages.

Berman, et al., "Application-Level Scheduling on Distributed Heterogeneous Networks (Technical Paper)", available at least as early as Mar. 6, 2007, at <<http://citeseer.ist.psu.edu/cache/papers/cs/30161/http:zSzzSzwww-cse.ucsd.eduzSz~gshaozSzpaperszSzsup96.pdf/application-level-scheduling-on.pdf>>, pp. 1-29.

Khokhar, et al., "Heterogeneous Computing: Challenges and Opportunities", available at least as early as Mar. 6, 2007, at <<http://meseec.ce.rit.edu/eecc722-fall2002/papers/hc/1/r6018.pdf>>, IEEE, 1993, pp. 18-27.

Lyonnard, et al., "Automatic Generation of Application-Specific Architectures for Heterogeneous Multiprocessor System-on-Chip", available at least as early as Mar. 6, 2007, at <<http://delivery.acm.org/10.1145/380000/379015/p518-lyonnard.pdf?key1=379015&key2=7123613711&coll=GUIDE&dl=GUIDE&CFID=16158147&CFTOKEN=58686892>>, ACM, 2001, pp. 518-523.

Sun, et al., "Synthesis of Application-Specific Heterogeneous Multiprocessor Architectures using Extensible Processors", available at least as early as Mar. 6, 2007, at <<http://ieeexplore.ieee.org/iel5/9501/30140/01383333.pdf?isNumber=>>, IEEE, 2005, pp. 1-6.

U.S. Appl. No. 60/692,190 entitled "Secure and Stable Hosting of Third-Party Extension to Web Services," Hunt et al, filed on Jun. 20, 2005.

U.S. Appl. No. 60/730,546 entitled "Programming Language Support for Software Isolation Processes (SIPs) and Isolated Extensions and Device Drivers Based Upon SIPs," Hunt et al, filed on Oct. 26, 2005.

The Japanese Office Action mailed May 24, 2011 for Japanese Patent Application No. 2005-354079, a counterpart foreign application of US Patent No. 7,451,435, 4 pages.

Russian Office Action mailed Apr. 18, 2011 for Russian Patent Application No. 2008116714, a counterpart foreign application of U.S. Appl. No. 11/428,096, 6 pages.

The Chinese Office Action mailed May 19, 2011 for Chinese Patent Application No. 200680040116.1, a counterpart foreign application of U.S. Appl. No. 11/428,096, 10 pages.

Office Action for U.S. Appl. No. 11/694,455, mailed on Aug. 17, 2011, Orion Hodson, "Homogeneous Programming For Heterogeneous Multiprocessor Systems", 11 pgs.

Final Office Action for U.S. Appl. No. 11/694,339, mailed on Aug. 3, 2011, Orion Hodson, "Master and Subordinate Operating System Kernels for Heterogeneous Multiprocessor Systems", 12 pgs.

* cited by examiner

CONFIGURATION OF ISOLATED EXTENSIONS AND DEVICE DRIVERS

RELATED APPLICATIONS

This application claims priority to U.S. Patent Provisional Application Ser. No. 60/730,546, filed Oct. 26, 2005, the disclosure of which is incorporated by reference herein.

BACKGROUND

Software systems, such as operating system, typically come with a pre-defined set of software modules for performing various tasks. These modules are associated with each other because they are all part of the same pre-defined set.

However, additional functionality and/or customization are often desired. In other words, the functionality is "extended." Typically, software systems allow for extension by providing for dynamic addition of new software modules or processes. These additions are often called "extensions" or "plug-ins." Common examples of extensions or plug-ins in conventional systems include, but are not limited to, device drivers for operating systems, extended stored procedures in databases, plug-ins and ActiveX™ controls in web browsers, ISAPI content and filter extensions in web servers, shell extensions for user interface shells, etc. The functionality added by extensions ranges from simple support for updated versions of hardware devices to virus scanners to workflow tools in email clients. However, the conventional approach for integrating extensions can be problematic.

For example, a conventional operating system ("OS") loads extensions by loading a set of executable instructions into the kernel protection domain. Once the driver is installed into this address space, the conventional kernel cannot prevent the loaded extension from accessing any (or all) hardware in the computing system. Consequently, a malformed or malicious extension may wreak havoc in an OS kernel.

A device driver is a type of extension found in operating systems. A device driver is a software module that extends the operating system to access a specific device or class of devices. For example, an IDE driver, allows the operating system to access disk drives attached to an IDE storage controller. Device drivers perform a vital function, abstracting common functionality understood by the operating systems or applications—such as reading and writing blocks of disk storage—from the mechanics of talking to specific of hardware—such as a specific vendors storage controller. While device drivers often access physical devices, those skilled in the art will recognize that device drivers may also provide access to virtual resources or may be layered to add additional functionality—such as a compression driver that sits above a storage controller's device driver.

The complexity of device drivers has grown considerably in the last decade as users have come to expect rich features such as hot-swapping and power management. Many conventional operating systems have responded in a variety of ways, but at their core these systems possess the same driver model they possessed a decade ago.

Like the extension, a conventional operating system ("OS") loads device drivers by loading executable instructions into the kernel protection domain. Once the driver is installed into this address space, the conventional kernel cannot prevent the loaded driver from accessing any (or all) hardware in the computing system.

Furthermore, as these drivers are typically written with low-level primitives to access hardware directly, the conventional kernel rarely verifies that drivers use only appropriate hardware resources. Instead, the conventional kernel trusts that the driver will only access hardware for the device it claims to serve. Furthermore, often the conventional kernel cannot guarantee that a driver is configure correctly, that a driver will respect the memory that is allocated to active processes, or even the memory allocated to other components within the conventional kernel.

Consequently, conventional drivers are among the most unreliable components in the OS. Some reports indicate that 85% of diagnosed crashes in the most popular conventional OS are caused by drivers. Other reports indicate that the drivers for a less-popular conventional OS are seven times more likely to contain bugs than other executable instructions in the kernel.

SUMMARY

Described herein are one or more implementations for describing and/or addressing the configuration requirements of applications, extensions, device drivers, and other components of a software system.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same numbers are used throughout the drawings to reference like elements and features.

DETAILED DESCRIPTION

Figure 1:
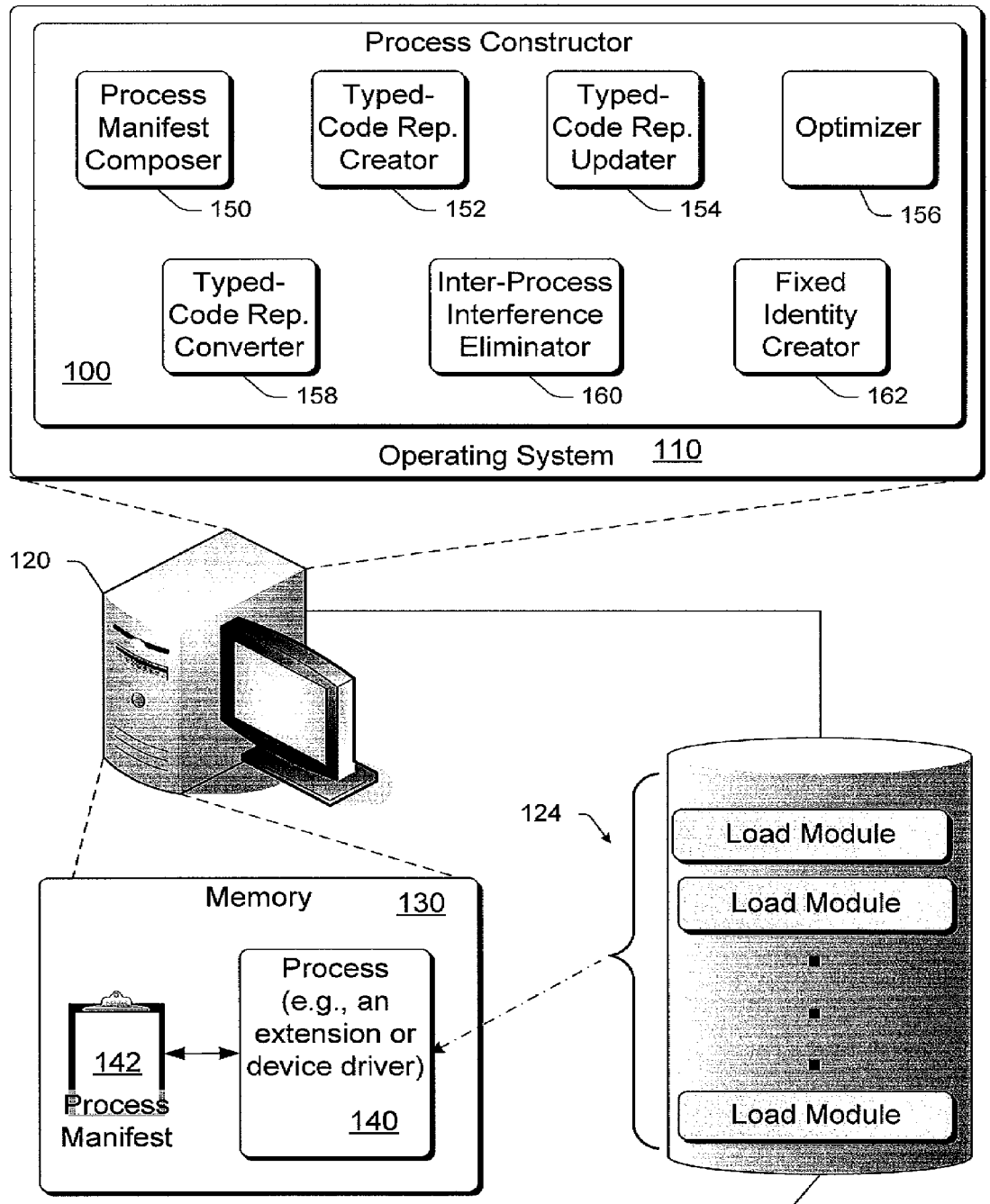
FIG. 1 is an operational scenario for an operating system architecture that supports one or more implementations described herein.

The following description sets forth techniques for describing and/or addressing the configuration requirements of applications, extensions, device drivers, and other components of a software system.

Conventional extensions (e.g., device drivers) include executable instructions for direct access to computing resources, such as input/output (I/O), memory, video, sound, interrupt request (IRQ) lines, or other hardware. Unlike the conventional extensions, extensions (e.g., device drivers), created in accordance with the one or more implementations described herein, access computing resources via one or more local-access objects, which are objects (i.e., executable instructions with one or more data structures) that provide a gateway or bridge to computing resources.

With one or more described implementations, the extensions contain embedded metadata that specify their configuration requirements include their need for these resources. The operating system (OS) determines the computing resource needs of the extension based upon this metadata. The OS providing the necessary executable instructions (in the form of the local-access objects) to allocate the required resources and connect the extension to computing resources outside its process.

This new division of labor provides the extension's host (the OS in one or more embodiments for device drivers) with the ability to verify all configuration requirements and control all access by the extension to I/O or IPC resources.

The following co-pending patent applications (which are commonly owned by the same assignee as this application) are incorporated herein by reference:

U.S. patent application Ser. No. 11/005,562, which was filed on Dec. 6, 2004 and is titled "Operating-System Process Construction," which is called the "Operating-System Process Construction," herein. This application provides details on the creation of isolated processes.

U.S. patent application Ser. No. 11/007,655, which was filed on Dec. 7, 2004 and is titled "Inter-Process Communications Employing Bi-directional Message Conduits," which is called the "Inter-Process Communications Employing Bi-directional Message Conduits," herein. This application provides details regarding inter-process communication between isolated processes.

U.S. patent application Ser. No. 11/007,808, which was filed on Dec. 7, 2004 and is titled "Self-Describing Artifacts and Application Abstractions," which is called the called the "Self-Describing Artifacts and Application Abstractions," herein. This application provides details regarding creation of an application, which includes one or more processes.

Software Isolated Processes

In the realm of computer science and, more particularly, the art of operating systems, the term "software process" (or more simply, "process") is well-known. Applications are often composed of one or more processes. The operating system (OS) is aware of and, indeed, may manage and supervise one or more separate processes running on a computer.

Herein, a process contains executable instructions. A program module also contains executable instructions. One or more processes may execute based upon a program module.

Herein, an extension may be described as a program module. Furthermore, a device driver is an example of an extension. One or more embodiments described herein may be implemented via an isolated process. The context of an isolated process is described in the context of FIG. 1.

One or more implementations are described herein to operate in an OS model which provides for and/or supports configuration a of Software-Isolated Process (SIP) abstraction model. SIPs encapsulate pieces of a program or a system and provide information hiding, failure isolation, and strong interfaces. SIPs are used throughout the operating system and application software.

FIG. 1 shows an operational scenario for the construction of SIPs. It shows a process construction architecture 100 as part of an operating system 110 stored and/or executing on a computer 120. The process construction architecture 100 may be, as shown in FIG. 1, part of the operating system. Alternatively, all or part of the process construction architecture 100 may be separate from the operating system, but still working in cooperation with the operating system.

The process construction architecture 100 constructs processes in a computer's working memory from a dynamic set of constituent components edited by a set of extending components. Once constructed, the executable instructions of an active process are fixed. Once fixed, an active process does not usually run new processor-executable instructions. In order to do that, the process is typically freshly re-constructed with the new executable instructions as part of it, or a new add-on process is created.

The dynamic set of constituent and extending components is typically manifested as a set of load modules stored in computer storage. The process construction architecture 100 constructs processes in a manner that allows for analyses regarding one or more various properties of processes (e.g., integrity, security, reliability, availability, resource-usage analysis, completeness analysis, and/or stability) to be performed, as well as for various desirable optimizations to be performed.

Computer 120 includes a computer storage device 122 (e.g., hard drive, RAID system, etc.) that stores a set of load modules 124 and a working memory 130. In the example in FIG. 1, the process construction architecture 100 constructs a process 140 which is stored in working memory 130. As depicted here, the process 140 is constructed from the load modules 124, which are manifestations of the process's constituent components edited by the process's extending components.

The process 140 has a process manifest 142, which defines the ultimate contents of the process 140. Part of those ultimate contents includes the process's constituent components edited by the process's extending components. As depicted here, the process manifest 142 is directly associated with a process (such as process 140) whose composition it describes.

In constructing a process, the process construction architecture 100 may employ one or more of the following functional components: a process manifest composer 150, a typed-code representation creator 152, a typed-code representation updater 154, an optimizer 156, a typed-code representation converter 158, an inter-process interference eliminator 160, and a fixed identity creator 162. While FIG. 1 shows these functional components as separate from each other, the functionality of one or more of these functional components may be combined.

The "Inter-Process Communications Employing Bi-directional Message Conduits" application (referenced above) discloses the components of an OS model that supports inter-process communications which may be used amongst SIPs (and the OS as well).

With SIPs, all executable instructions outside the kernel execute in a SIP and communicate with other SIPs through strongly typed communication channels. A SIP is a closed environment, which does not allow data sharing or dynamic code loading. SIPs differ from conventional OS processes in a number of ways.

A new kernel (which supports implementations described herein and which is represented by operating system 210) consists almost entirely of safe executable instructions and the rest of the system, which executes in SIPs, consists of verifiably safe executable instructions, including device drivers, system processes, and applications. While all untrusted executable instructions must be verifiably safe, parts of the new kernel and run-time system, called the trusted base, are not verifiably safe. Language safety protects this trusted base from untrusted executable instructions. Moreover, the integrity of each SIP depends on instruction safety and on a system-wide invariant that a process does not hold a reference into another process's object space.

Inter-Process Communication

In at least one described implementation, SIPs communicate exclusively by sending messages over channels. A channel is a bidirectional, behaviorally typed connection between two processes. Messages are tagged collections of values or message blocks in the Exchange Heap that are transferred from a sending to a receiving process. A channel is typed by a contract, which specifies the format of messages and valid messages sequences along the channel.

A SIP creates a channel by invoking a contract's static NewChannel method, which returns the channel's two endpoints—asymmetrically typed as an exporter and importer—in its output parameters.

The SIP can pass either or both endpoints to other processes over existing channels. The process receiving an endpoint has a channel to the process holding the other, corresponding endpoint. For example, if an application process wants to communicate with a system service, the application creates two endpoints and sends a request containing one endpoint to the system's name server, which forwards the endpoint to the service, thereby establishing a channel between the process and the service.

A send on a channel is asynchronous. A receive synchronously blocks until a specific message arrives. Using language features, a thread can wait for the first of a set of messages along a channel or can wait for specific sets of messages from different channels. When data is sent over a channel, ownership passes from the sending process, which may not retain a reference to the message, to the receiving process. This ownership invariant is enforced by the language and run-time systems, and serves three purposes. The first is to prevent sharing between processes. The second is to facilitate static program analysis by eliminating pointer aliasing of messages. The third is to permit implementation flexibility by providing message-passing semantics that can be implemented by copying or pointer passing.

Isolated Extensibility

Software creators rarely anticipate the full functionality demanded by users of their system or application. Rather than trying to satisfy everyone with a monolithic system, most non-trivial software provides mechanisms to augment its functionality by loading additional executable instructions. For example, some conventional commercially available personal computer operating systems support over 100,000 third party device drivers, which enable an OS to control almost any hardware device. Similarly, countless Internet browser add-ons and extensions augment a browser's interface and components for web pages. Even open source projects—although potentially modifiable—provide "plug-in" mechanisms, since extensions are easier to develop and distribute than new software versions.

An extension usually consists of executable instructions that are dynamically loaded into the address space of the parent of the extension. With direct access to the parent's internal interfaces and data structures, extensions can provide rich functionality. However, this flexibility comes at a high cost. Extensions are a major cause of software reliability, security, and backward compatibility problems. Although extension executable instructions are often untrusted, unverified, faulty, or even malicious, they are loaded directly into a program's address space with no hard interface, boundary, or distinction between host and extension.

Extensions are often the source of incompatibility, poor functionality, or other errors. Moreover, because an extension lacks a hard interface it can become dependent on details of its parent's implementation, which constrains evolution of future versions of a program and requires extensive testing to avoid incompatibilities.

Dynamic loading of executable instructions imposes a second, less obvious tax on performance and correctness. A system that can dynamically load executable instructions is an open environment in which it is difficult or impossible to make sound assumptions about the system's states, invariants, or valid transitions Consider a Java™ virtual machine (JVM), in which, at any time, an interrupt, exception, or thread switch can execute instructions that load a new file, override class and method bodies, and modify global state. In general, there is no feasible way to analyze a program running in such an environment, except under the unsound assumption that the environment does not arbitrarily change between two executable instructions.

The new approach employed by one or more implementations described herein is to prohibit dynamic loading of executable instructions and isolate a dynamically created extension in its own environment. Previous attempts along these lines were not widely used because the isolation mechanisms had performance and programmability problems that made them less attractive than the risks of running without isolation.

The most prevalent isolation mechanism is a traditional OS process, but its high costs limit its usability. Memory management hardware on modern processors provides a process with hard boundaries and protects processor state, but it imposes a high penalty on inter-process control and data transfers. On modern x86 processors, switching between processes can cost hundreds to thousands of cycles, not including TLB and cache refill misses.

More recent systems, such as the Java™ virtual machine (JVM) and Microsoft® Common Language Runtime (CLR), are designed for extensibility and consequently use language safety, not hardware, as the mechanism to isolate computations running in a same address space. However, safe languages, by themselves, may be an insufficient guarantee of isolation. Shared data provides a path between computations' object spaces, at which point reflection APIs provide a mechanism to subvert data abstraction and information hiding. As a consequence, these systems require complex security mechanisms and policies, such as JVM fine grain access control or the CLR's Code Access Security, to control access to system mechanisms and interfaces.

In addition, computations that share a run-time system and execute in a same process are not isolated upon failure. When a computation running in a JVM fails, the entire JVM process typically is restarted because it is difficult to isolate and discard corrupted data and find a clean point to restart the failed computation.

At least one implementation described herein employs SIPs to encapsulate executable instructions of system components in a closed environment. Extensions to the system or an application run in a new SIP and communicate with a parent over channels that provide limited and appropriate functionality. If the extension fails, its SIP terminates, which allows the OS to reclaim resources and notify the communication partners. Since these partners did not share state with the extension, error recovery is local and is facilitated by the explicit protocols of the channels.

One or more implementations described herein provide compile-time reflection (CTR), which provides functionality that executes when a file is compiled to generate new executable instructions. Normal reflection, which executes at run time, has access to run-time values and is more general than CTR. However, in many cases, the desired new executable instructions are known ahead of execution. In these cases, CTR produces new executable instructions during compilation.

Computer Architecture supporting Configuration of Isolated Device Drivers

Some conventional device drivers are loaded into the kernel's address space and hardware protection domain with no mechanisms to isolate the driver's executable instructions from the kernel's executable instructions. However, one or more described implementations described an operating system that support isolated device drivers.

Figure 2:
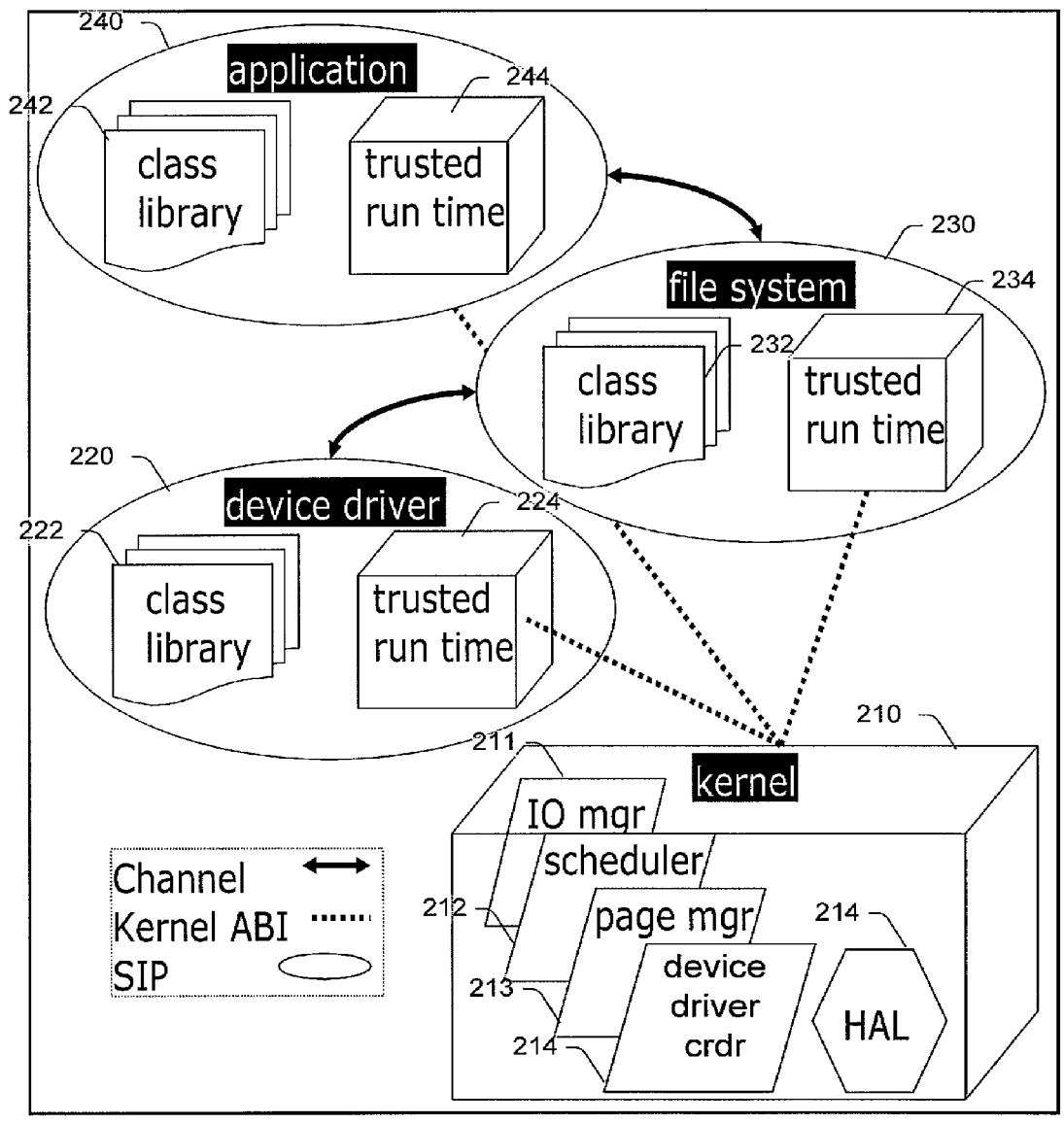
FIG. 2 is a block diagram of an operating system architecture that supports one or more implementations described herein.

FIG. 2 depicts an exemplary operating system (OS) architecture 200 that supports configuration of isolated extensions and device drivers and one or more of the implementations described herein. As depicted, the exemplary OS architecture 200 shows a kernel 210, one or more device drivers 220, one or more file systems 230, and one or more applications 240. Those skilled in the art will recognize that the OS may include additional OS services that run in SIPs like the file system 330.

The kernel 210 is a privileged system component that controls access to hardware resources, allocates and reclaims memory, creates and schedules threads, provides intraprocess thread synchronization, and manages I/O.

The kernel 210 provides the core functionality of the OS. That includes, for example, managing memory and other hardware resources, process creation and termination, inter-process communications, channel operations, scheduling, and I/O. Some of the components of this kernel 210 include an 10 manager 211, scheduler 212, page manager 213, device driver coordinator 214, and hardware abstraction layer (HAL) 215.

Executable instructions in this exemplary OS architecture 200 are either verified or trusted. The type safety and memory safety of the verified instructions is checked by a compiler. Unverifiable instructions must be trusted by the OS and are limited to the HAL 215, kernel 210, and parts of the trusted run-times 324, 334, and 344. Most of the kernel is verifiably safe.

All executable instructions outside the kernel and trusted runtime are written in a safe language, such as C# or Java, translated to a safe intermediate language, such as Microsoft® Intermediate Language (MSIL), and then compiled to processor executable instruction by one or more other back-end compilers.

The dividing line between the kernel instructions and SIP's instructions is blurred by the trusted run-time system. The trusted run-time contains trusted, but unverifiable, executable instructions. The executable instruction of the runtime are protected from the SIP's instructions, because their verified type safety safety prevents them from interacting with the run-time system and its data structures except through safe interfaces. In many cases, the back-end compiler can safely in-line instructions from the trusted runtime into the SIP's other executable instruction, thereby safely moving operations that would traditionally run in a kernel into a user process.

The executable instructions of the device driver 220 has include instructions written by the programmer of the device driver plus executable instructions from one or more class libraries 222 and its trusted runtime 224. Similarly, as depicted, the file system 230 includes executable instructions from class libraries 232 and its trusted runtime 234. Moreover, as depicted, the application 240 includes executable instructions from class libraries 242 and its trusted runtime 244.

Figure 3:
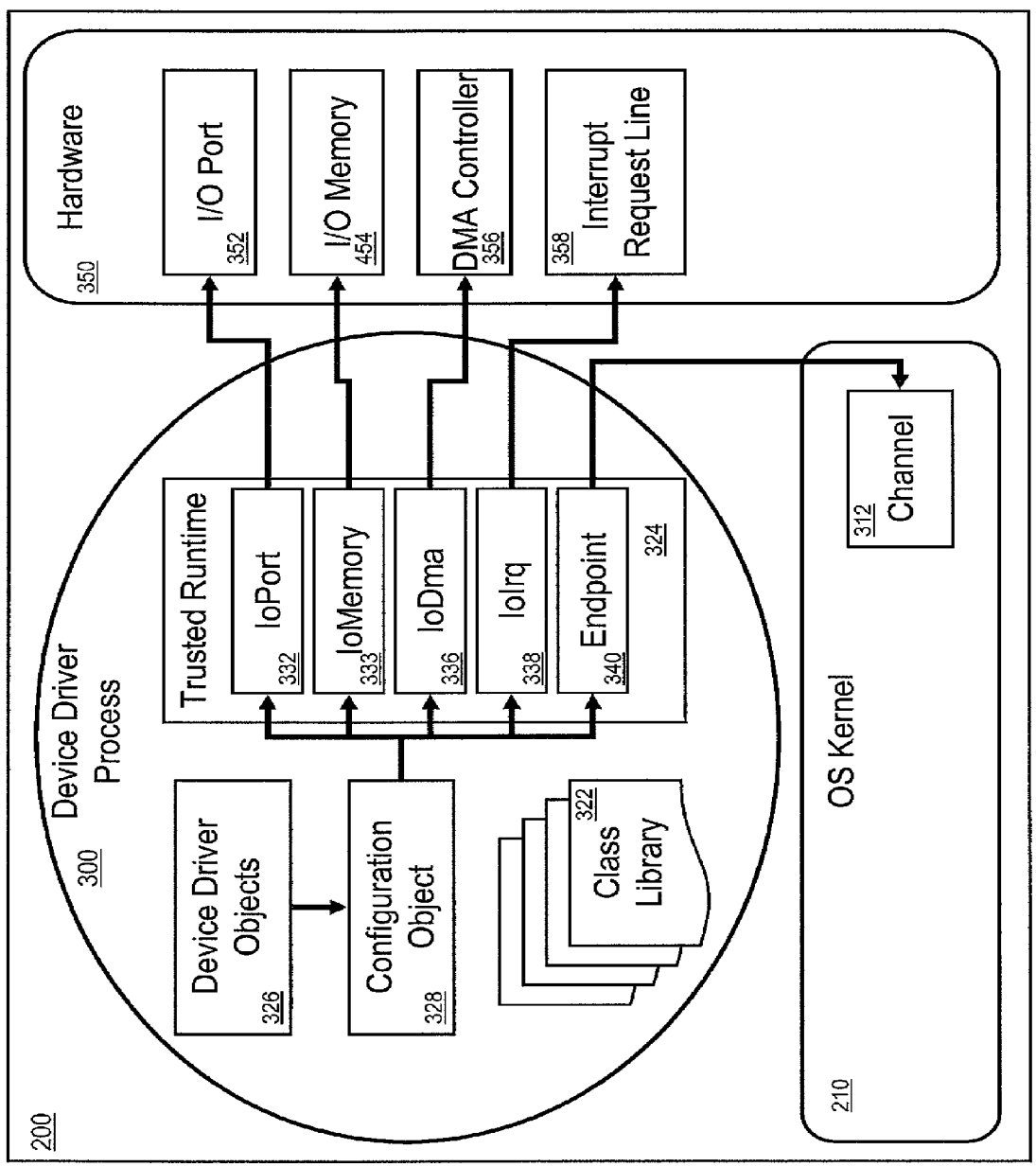
FIG. 3 is a block diagram of the objects within a device driver process and their relationship to other portions of the operating system architecture shown in FIG. 2.

FIG. 3 depicts the objects related to configuration within an exemplary device driver process 300 and their relationship to other portions of an exemplary operating system (OS) architecture 200 supported by one or more of the implementations described herein. As depicted, the exemplary OS architecture 200 shows an OS kernel 210, an exemplary device driver process 300, and hardware and other computing resources 350.

The OS kernel 3310 includes one or more channels 312 to enable inter-process message-passing. As depicted, the hardware and other computing resources 350 include an I/O port 352 (also known as an I/O register), I/O memory 354, a DMA controller 356, and an interrupt request (IRQ) line 358. Of course, these are just examples of some hardware and other computing resources. Other implementations may include other common and uncommon hardware and other computing resources. Implementations may also include more than one I/O port 352, I/O memory 354, DMA controller 356, or interrupt request line 358. Some implementation may not include all of these types of hardware resources.

The exemplary device driver process 300 contains objects implementing the device driver's functions, device driver objects 326. The device driver process 300 also contains a trusted runtime 224, zero or more class libraries 222, and a configuration object 328.

The device driver objects 326 include is an example of an untrusted program module. Unlike the conventional approaches, the executable code of the device driver is not given free reign. However, its actions are also not overseen or checked on either. Instead, with one or more implementations described herein, the untrusted device driver is given free, but indirect, access to a limited set of computing resources.

The trusted runtime 224 includes access objects that mediate access to hardware and IPC resources. These access objects include (by way of example and not limitation) IoPort 332, IoMemory 334, IoDma 336, IoIrq 338, and endpoint 340. The access objects in the trusted runtime 224 act as a gateways for the following resources:

oPort 332 ➔I/O Port 352;
IoMemory 334 ➔Memory 354;
IoDma 336 ➔DMA Channel 356;
IoIrq 338 ➔IRQ Line 358;
Endpoints 340 ➔Channel Handler 312.

Unlike conventional device drivers, the files containing the executable instructions of the device driver objects 326 do not include executable instructions to configure the device driver or to directly access hardware and other computing resources, such as that depicted at 350. Instead, the executable instruction in the device driver objects 326 only access hardware and other computing resources via access objects 332, 334, 336, 338, and 340, whose executable instructions are contained within the trusted runtime 224.

Executable instructions to create the configuration object 328 and to access objects 332, 334, 336, 338, and 340, are not included in the files provided by the device driver programmer Instead, the device driver programmer embeds configuration requirements as metadata attached to the executable instructions for the device driver. With one or more described implementations, the executable instructions for creating the configuration object 328 and access objects 332, 334, 336, 338, and 340 are separate and set apart from the executable instructions of rest of the devices driver's objects.

In one or more implementations the executable instructions to create the configuration object 328 are provided by the operating system. In one implementation these executable instructions are generated at install time using compile-time reflection (CTR) templates. The CTR templates process the configuration requirements embedded as metadata within the description of the configuration object encoded in the device driver. In another implementation, the CTR templates process a manifest, portions of which were created from the configuration metadata in the files containing the executable instructions for the device driver objects 326. In another implementation, executable instructions in the trusted runtime 224 create the configuration object by interpreting either the configuration metadata or the device driver manifest.

The exemplary OS architecture 200 runs each device driver (such as driver 220) in a separate software isolated process (SIP). The exemplary OS architecture 200 uses language safety to verify that no SIP is capable of writing onto another SIP's pages. Encapsulated in SIPs, individual drivers can be stopped and restarted as needed without bringing down the entire operating system.

Programs for the exemplary OS architecture 200 are statically linked at install time to a trusted runtime. While programs are statically verified for type safety, each trusted runtime is a component of they system's trusted computing base (TCB). Executable instructions from in the trusted runtime maintain process isolation, allowing processes to run in the privileged/supervisor mode of the host processor without being able to affect the memory and hardware resources of other processes. In one described implementation, dynamic reflection or other mechanisms that can circumvent type safety are not permitted in executable instructions provided by the device driver programmer.

The trusted runtime for device drivers provides a safe environment that abstracts communication with hardware. The processor executable instructions for handling interrupt requests, accessing fixed memory, accessing I/O ports (also known as I/O registers), and controlling direct memory access controllers (DMA) are protected through access objects exposed by the driver runtime.

All inte-rprocess communication (IPC) is through strongly typed bidirectional channels. These channels have exactly two endpoints. Messages on a channel are restricted to value types, and the format of these messages is defined by a contract. The contract also serves as a channel protocol that specifies valid sequences of messages sent across the channel, and includes a handshaking step to initiate communication. An application's conformance to a contract can be statically verified.

Some endpoints have a public name in order to allow easy connection by clients. This is achieved through a singly rooted, globally accessible namespace. A global namespace server manages the namespace, and allows the mapping from names to channel endpoints, directories, and symbolic links. The namespace is not attached to a persistent backing store. Instead, system policy permits some applications (such as the filesystem) to create virtual subtrees within the namespace and map content into these trees. This allows the equivalent of a traditional file system, with the distinction that file access is through the channel abstraction.

The exemplary OS architecture 200 has an abstraction for treating applications (such as 240) as first-class entities, which enables the operating system to reason about applications and provide guarantees. Device drivers are a subclass of this abstraction. Furthermore, device driver installation is a first-class operation performed by the OS on applications.

In the exemplary OS architecture 200, the device driver declares its I/O and IPC configuration requirements. In conventional approaches, configuration requirements are undiscoverable. Here, the configuration requirements are encoded in the same file as the device driver's executable instructions. The encoded configuration requirements can be converted, for easier processing, into a standalone specification that declares the configuration requirements.

The configuration requirements are verifiable at compile time, install time, boot time, and execution time. In effect, the encoding of configuration requirements into same file as the device driver turns it into a self-describing artifact. Given the set of MSIL assemblies for the device driver, the OS can reason completely about the configuration preconditions (and dependencies on both software and hardware resources) that must be met in order for the device driver to function correctly.

With the application abstraction and driver configuration declarations, the exemplary OS architecture 200 may provide guarantees about the I/O and IPC resources used by a device driver. For example, the OS can detect configuration conflicts before the driver executes by comparing the set of resources desired by a new device driver with the set of resources used by all other device drivers and checking for overlapping—and therefore conflicting—resources such as ranges of I/O port or I/O memory. In a preferred embodiment, configuration conflicts are detected at install time and installation is allowed only if there are no conflicts between the new device driver and the rest of the system, including all previously installed device drivers.

As another example, the OS can create a valid total boot order—the order in which device drivers are initialized—by extracting from each device driver its configuration dependencies, then sorting the list so that no device driver is initialized before one of its dependencies. Automatic creation of a valid total system boot order is a significant advance over previous systems where a boot order is either hard coded into the OS at development time or where the boot order is manually updated by an administrator. As a final example of the guarantees derived from the declarative configuration requirements, the OS is able to generate all of executable instruction for driver initialization related to configuration of the driver and acquisition of resources. As such, the OS can guarantee that drivers only use declared resources and that resources are acquired following system policies. These capabilities increase the reliability and maintainability of the system with no significant cost in run-time performance.

Device Driver Coordination

Unlike conventional approaches, the device driver coordinator 214 of one or more implementations described herein prevents a driver from accessing inappropriate memory locations or other hardware resources. Conversely, the device-driver coordinator allows a driver to access only appropriate memory locations and other hardware resources. Furthermore, rather than a driver directly accessing hardware and resources (which is what conventional approaches allow), the kernel 210 vets a driver's access to hardware and resources.

One or more implementations described herein have an input/output (I/O) system consisting of three layers: HAL 214, I/O manager 211, and drivers 220. The HAL 214 is a small, base of trusted executable instructions that abstracts access to the computer's hardware. For example, in one embodiment, the HAL implemented four access objects for manipulating hardware: the IoPort object 332 for accessing an I/O port 352 (also known as an I/O register), the IoMemory object 334 for accessing I/O memory 354, the IoDma object 336 for accessing a DMA controller 356, and the IoIrq object 338 for accessing an interrupt request line 358. In one embodiment, the HAL 314 also includes executable instruction to controller the timer, interrupt controller, and real-time clock hardware. The I/O manager 211 is responsible for initializing device drivers and connecting applications to device drivers 220.

The kernel 210 uses either device driver 220 configuration metadata directly, or manifests for each device driver (e.g., process manifest 142 depicted in FIG. 1) to configure device drivers 220 and connect the resources the need to execute correctly. On startup, the kernel 210 does a plug and play configuration of the system. The kernel 210 uses information acquired from the BIOS by the boot loader and from buses, such as the PCI bus, to enumerate devices, to start the appropriate device drivers, and to pass these drivers objects that encapsulate access to device hardware.

Each driver 220 is written in safe executable instructions and runs in its own process. Drivers communicate with other parts of the system, including the network stack and file system, exclusively through channels. When a driver starts, the I/O manager 211 provides—as required by the manifest of the device driver 220 I/O access object 332, 334, 336, and 338 for communicating with device hardware 352, 354, 356, and 358. All these access objects provide a safe interface that checks each reference before directly accessing the hardware's memory mapped locations.

In one embodiment using software isolation, the entire executable instruction for the I/O access objects are contained within the trusted runtime 324 and running within the driver-driver process 300. The checks to insure that access to hardware is valid are performed by executable instructions in the I/O access objects 332, 334, 336, and 338 in the trusted runtime 224. In another embodiment using hardware isolation, the process isolation hardware of the processor is programmed to allow a device driver to access only specific regions of the I/O port space or I/O memory space to which the driver has been granted access. In the embodiment using hardware isolation, executable instructions to configure the process isolation hardware reside within the OS kernel 210.

Driver Configuration

One or more implementations use configuration requirements encoded in metadata in system components to describe pieces of the system, explain how they fit together, and specify their behavioral interaction with other portions of the system. The metadata declaratively labels each component of the system, such as the kernel, an application, or device driver and its configuration requirements. The configuration requirements include information about the dependencies, exported services, and resource requirements. Tools use this metadata before system execution to verify that executable instruction of the system component can be configured correctly. This metadata is used during system execution to configure each component of the system correctly so that it can execute as intended by its programmer.

System metadata is archived in one or more system stores called manifests. A top-level system manifest points to manifests describing individual component (such as device drivers). Through these manifests, software, such as a boot loader or system verifier, can discover every component of the system.

The system manifests are sufficient to enable off-line analysis of the system. With implementations described herein, an administrator is capable of discovering the answer to many "device-driver" related questions using only a description of the hardware devices and the system manifest. Such questions include, for example, will the system boot on the particular hardware, which drivers and services will initialize, and which applications can run?

Specification

A runnable system image contains configuration requirements for the entire system embedded as metadata. Using the metadata, one or more of the described implementations maintains three invariants. First, the OS will never install a device driver that cannot start successfully due to configuration requirements that conflict with another driver or another portion of the system. Second, the OS will never start a device driver that cannot run successfully due to either configuration conflicts or missing resources. Third, a device driver cannot use resources at runtime that weren't declared in its configuration requirements.

Where possible, one or more implementations described herein use custom metadata attributes in high-level languages to interleave configuration requirements into source code, so that only one source document must be maintained. Custom attributes may be attached to source code entities such as class, method, or field declarations. A compiler encodes attributes into the file containing the resulting intermediate-language executable instructions. Compilers, linkers, installation tools, and verification tools can read the metadata encoded with the executable instructions even though they don't executing the instructions.

As an example, the following source code shows some attributes used to declare the configuration requirements of a video device driver (such a S3™Trio64™ video device driver):

```
[DriverCategory]
[Signature("/pci/03/00/5333/8811")]
class S3TrioConfig : DriverCategoryDeclaration
{
    // Hardware resources from PCI config
    [IoMemoryRange(0, Default = 0xf8000000, Length = 0x400000)]
    IoMemoryRange frameBuffer;
    // Fixed hardware resources
    [IoFixedMemoryRange(Base = 0xb8000, Length = 0x8000)]
    IoMemoryRange textBuffer;
    [IoFixedMemoryRange(Base = 0xa0000, Length = 0x8000)]
    IoMemoryRange fontBuffer;
    [IoFixedPortRange(Base = 0x03c0, Length = 0x20)]
    IoPortRange control;
    [IoFixedPortRange(Base = 0x4ae8, Length = 0x02)]
    IoPortRange advanced;
    [IoFixedPortRange(Base = 0x9ae8, Length = 0x02)]
    IoPortRange gpstat;
    // Channels
    [ExtensionEndpoint(typeof(ExtensionContract.Exp))]
    TRef<ExtensionContract.Exp:Start> iosys;
    [ServiceEndpoint(typeof(VideoDeviceContract.Exp))]
    TRef<ServiceProviderContract.Exp:Start> video;
    ...
}
```

The [DriverCategory] and [Signature] attributes declare this module to be a device driver for a specific class of PCI video devices. DriverCategory denotes a category of applications that implement device drivers for specific hardware. Other categories include ServiceCategory, for applications implementing software services, and WebAppCategory for extensions to a web server.

The [IoMemoryRange] attribute declares that frameBuffer is derived the first entry in the device's PCI configuration space. This location of the frame buffer is determined when the hardware is configured, and the hardware parameters, such as the size of the memory region, must be compatible with the configuration values in the attribute. The [IoFixedMemoryRange] and [IoFixedPortRange] attributes specify that a driver needs either a fixed range of address space for memory mapped access or a fixed ranges of I/O ports to access device registers.

In this embodiment, the IoDmaRange, IoIrqRange IoMemoryRange, and IoPortRange objects are containers for collections of consecutive access objects and can be used interchangeably with IoDma, IoIrq, IoMemory, and IoPort access objects respectively.

The [ExtensionEndpoint] attribute declares that the driver must be configured with a channel endpoint to communicate with the driver's parent process. In the case of device drivers, such as the S3™Trio64™, the I/O system is the parent process.

The [ServiceEndpoint] attributes declares that the driver must be configured with a channel endpoint to the system directory service and that applications using the video driver will be bound to the device driver by the directory service through this endpoint.

Compile Time

At compile time, the high-level language compiler embeds custom attributes as metadata into the file containing the intermediate-language executable instructions for the device driver. Using an intermediate-language metadata access library, one or more described implementations can retrieve the embedded metadata from the intermediate-language file without executing the executable instructions contained within the file.

At link time, a manifest creation tool reads the custom attributes metadata from the intermediate-language file to create an application manifest. An application manifest is an XML file enumerating the application's components and configuration requirements. Application manifests are described in more detail in "Self-Describing Artifacts and Application Abstractions".

The following XML contains part of the manifest information for the video device driver (such a S3™Trio64™ video device driver):

```
<manifest>
    <application identity="S3Trio64" />
    <assemblies>
        <assembly filename="S3Trio64.exe" />
        <assembly filename="Namespace.Contracts.dll"
            version="1.0.0.2299" />
        <assembly filename="Io.Contracts.dll" version="1.0.0.2299"
            />
        <assembly filename="Corlib.dll" version="1.0.0.2299" />
        <assembly filename="Corlibsg.dll" version="1.0.0.2299" />
        <assembly filename="System.Compiler.Runtime.dll"
            version="1.0.0.2299" />
        <assembly filename="MS.SingSharp.Runtime.dll"
            version="1.0.0.2299" />
        <assembly filename="ILHelpers.dll" version="1.0.0.2299" />
        <assembly filename="OS.V1.ill" version="1.0.0.2299" />
    </assemblies>
    <driverCategory>
        <device signature="/pci/03/00/5333/8811" />
        <ioMemoryRange index="0" baseAddress="0xf8000000"
            rangeLength="0x400000" />
        <ioMemoryRange baseAddress="0xb8000"
            rangeLength="0x8000"
            fixed="True" />
        <ioMemoryRange baseAddress="0xa0000"
            rangeLength="0x8000"
            fixed="True" />
        <ioPortRange baseAddress="0x3c0" rangeLength="0x20"
            fixed="True" />
        <ioPortRange baseAddress="0x4ae8" rangeLength="0x2"
            fixed="True" />
        <ioPortRange baseAddress="0x9ae8" rangeLength="0x2"
            fixed="True" />
        <extension startStateId="3" contractName="MS.OS.Extending
            .ExtensionContract" endpointEnd="Exp"
            assembly="Namespace.Contracts" />
        <serviceProvider startStateId="3" contractName=" MS.OS.Io-
            .VideoDeviceContract" endpointEnd="Exp"
            assembly="Io.Contracts" />
    </driverCategory>
    ...
</manifest>
```

Installation Time

With one or more implementations described herein, the system guarantees not to install a device driver that cannot start. To do this, the system verifies that the device driver's entire configuration requirements can be satisfied before the device driver is installed.

An application is a first class abstraction in an OS supporting one or more implementations described herein. This concept is described in more detail in "Self-Describing Artifacts and Application Abstractions". In one embodiment, in order to be executed, a set of executable instructions is added to the application by an installer to initialize the application according to its configuration requirements. In an alternative implementation, the executable instructions to initialize the application according to its configuration requirements are contained in the trusted runtime and create the configuration object and access objects by interpreting the application's configuration metadata.

The installer starts with the metadata in the application's manifest. The installer verifies each of the application's assemblies exists and is type and memory safe. It also verifies all channel contracts are implemented correctly.

Once theses internal properties are resolved and verified, the installer next attempts to resolve and verify all external dependencies. For example, the installer ensures that any hardware resources used by a device driver do not conflict with hardware resources required by any other driver. The installer also verifies the existence of every type of channel used by the application. If the application exports a channel, the installer verifies that an exported channel does not conflict with another application. When conflicts arise, policy in the system manifest resolves them. For example, the manifest might declare that only one device driver can provide the video console contract. The installation of additional video drivers may be disallowed, or only a single video driver activated at boot time.

Compile Time Reflection (CTR) is used to generate trusted executable instruction to initialize the applications' configuration object and access objects for system resources. In one embodiment, the CTR templates execute at install time processing the attributed program elements in the assemblies named by the application manifest.

The installation process is completed by updating the system manifest metadata to incorporate the new application or device driver.

In at least one implementation, the entire installation process takes place offline with an installation becoming visible only at the next system boot. Alternatively, the entire installation process may be performed on-line and/or partially on-line.

Run Time

At run time, metadata drives the initialization of the kernel, device drivers, services, and applications. The boot loader reads a portion of the system manifest to determine which kernel, device drivers, and services should be loaded. The order in which these load and start executing is not specified anywhere; instead the system infers it from the specified dependencies.

As each application is started, the kernel verifies and resolves all metadata dependencies and builds a process configuration record in the kernel. Trusted executable instructions, emitted into the application using CTR, parses the configuration record to create the configuration object 328 and to create access objects 332, 334, 336, 338, 340 for accessing external resources. Compile time reflection (CTR) generates the executable instructions for the configuration object 428.

Returning to the example of the S3™Trio64™ device driver, the kernel records in the driver's configuration record the need for IoMemoryRange objects for frameBuffer, text-Buffer, and fontBuffer. The kernel also records the IoPortRange objects for control, advanced, and gpstat I/O ports. The kernel creates a channel to connect the device driver to the I/O subsystem and a second channel to connect the driver to the namespace. The channel endpoints are added to the driver's configuration record.

When the device driver starts executing, executable instructions in the trusted runtime creates the appropriate IoMemoryRange and IoPortRange access objects in the driver's object space. Because these can be constructed only by trusted runtime, a device driver only can access I/O resources declared in its configuration metadata and checked for conflicts by the kernel I/O subsystem.

Declaring channel endpoints in configuration metadata ensures three properties. First, the executable instructions for a SIP can be statically verified to ensure that they communicate only through filly declared channels, in strict conformance to the channel contracts. Second, applications need not contain global names. For example, the S3™Trio64™ video device driver is unaware of the /dev/video name in the system namespace. Instead, the driver uses a local name, S3Trio64Config.video, to refer to a channel with a given contract (ServiceProviderContract). The entire layout of the I/O namespace can change without affecting a single line of source code in the video driver. Third, applications can be "sandboxed," in conformance the principle of least possible privilege, to remove a source of error and security vulnerability in current systems. For example, although the S3™Trio64™ driver holds an endpoint connected to the system directory service, the driver has no ability to create new names or to connect to any other system process.

Methodological Implementation of the Isolated Device Drivers

Figure 4:
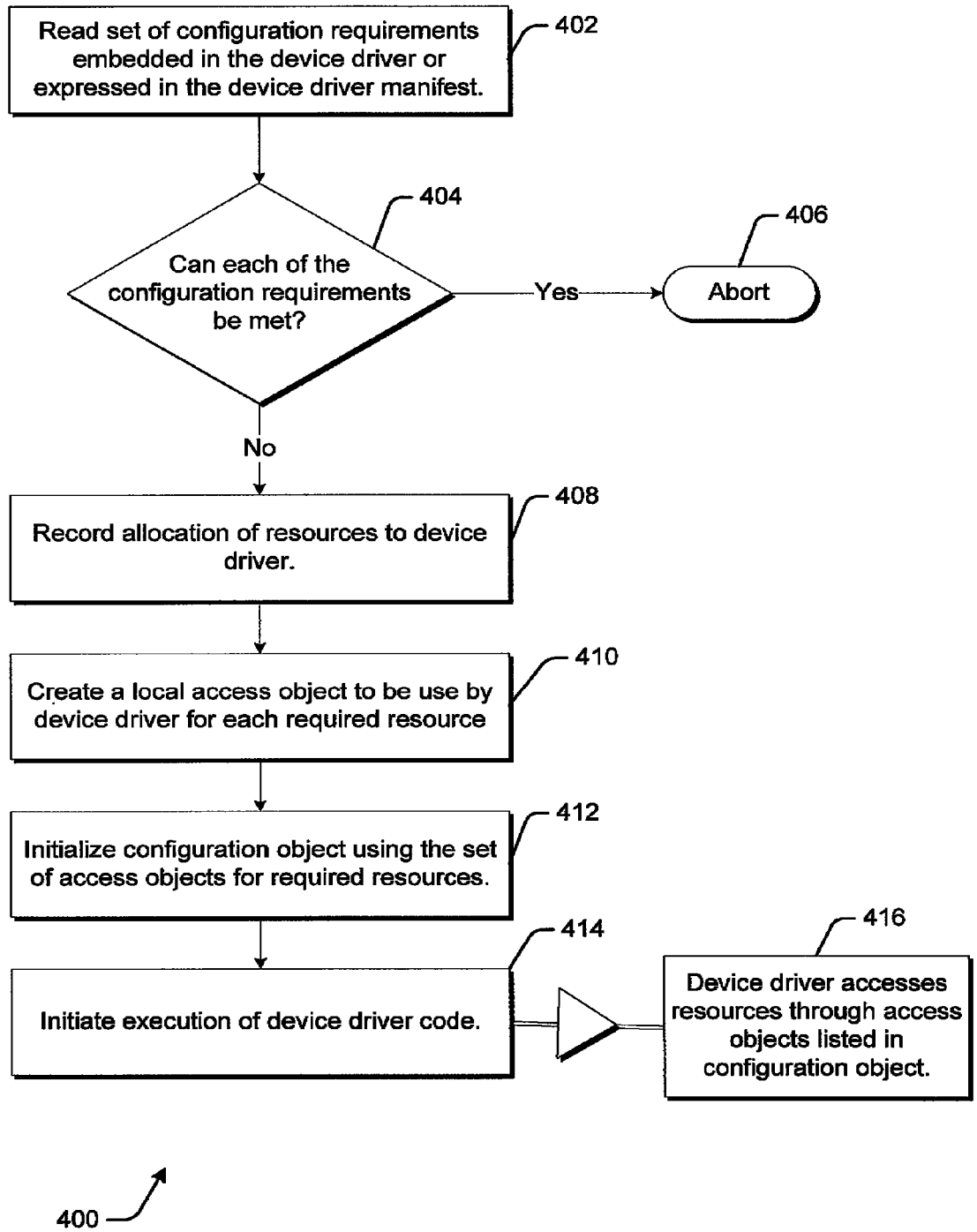
FIG. 4 is flowchart of another methodological implementation described herein.

FIG. 4 shows method 400 for initialization of any extension (such as a device driver. With this method 400, the OS reads the metadata from device driver's manifest to create device driver object. This method 400 is performed by the one or more of the various components as depicted in FIG. 1. Furthermore, this method 400 may be performed in software, hardware, firmware, or a combination thereof At 402 of FIG. 4, the operating system (OS) obtains an untrusted program module (such as a device driver). The OS determines a set of required or request computing resources from device driver's manifest. Here, computing resources may include virtual resources (such as a channel) or hardware resources (such as a range of I/O Ports or I/O memory) or other such resources.

The OS may make this determination by reading the manifest of the device driver. Alternatively, the OS may analyze the executable instructions of the device driver. Alternatively still, the OS may extract metadata from the executable instructions or an associated data structure.

At 404, the OS determines if any of the resources are already allocated to the OS or another device driver If so, the process aborts at 406; Alternative embodiments of the invention might follow the abort with additional policy, such as restarting the initialization process when the resources have been freed, negotiating with the current owner to free the resources, asking the user for permission to stop the conflicting driver, notifying the device driver writer of a potentially erroneous resource request, etc.

Also, here, the OS may make other determinations related to the device driver and the requested computing recourses. The OS confirms that the device driver is allowed to access that request computing resources and access it in the manner that it requests.

At 408, the OS records allocation of resources to the device driver.

At 410, the OS provides a trusted local-access object to be used by the device driver for each required or requested resource. The trusted-runtime objects (depicted in FIG. 3) are examples of local access objects.

The "providing" that the OS performs here may include simply employing already pre-set and fixed executable instructions (and data)—which are the local-access objects. It may include generating new instructions (perhaps based upon a template) that is customized to the particular needs and conditions. Or the OS may do something in between. For example, it may configure or slightly alter existing executable instructions—which are the local-access objects.

Indeed, the OS may insert or link the executable instructions (and data) of the trusted local-access object to the untrusted device driver so that the device driver may gain access via the inserted or linked local-access object.

At 412, the OS initializes the device configuration object using the set of local-access objects for the required resources. A configuration object may include additional settings specified in the manifests. An example of additional settings would be a setting telling a sorting extension the user's preferred data/time format.

At 414, the OS initiates execution of the device driver executable instructions. The executable instructions to initialize the device driver are provided by the OS or installation system and not by the device-driver programmer.

At 416, the executing device driver accesses the requested computing resources through local-access objects. Furthermore, the executing device driver can only access the requested computing resources (no others) and only via the linked or inserted local-access objects.

CONCLUSION

The techniques, described herein, may be implemented in many ways, including (but not limited to) program modules, general- and special-purpose computing systems, network servers and equipment, dedicated electronics and hardware, firmware, as part of one or more computer networks, combination thereof.

Although the one or more above-described implementations have been described in language specific to structural features and/or methodological steps, it is to be understood that other implementations may be practiced without the specific exemplary features or steps described herein. Rather, the specific exemplary features and steps are disclosed as preferred forms of one or more implementations. In some instances, well-known features may have been omitted or simplified to clarify the description of the exemplary implementations. Furthermore, for ease of understanding, certain method steps are delineated as separate steps; however, these separately delineated steps should not be construed as necessarily order dependent in their performance.

The invention claimed is:

1. A computer storage device having processor executable instructions that, when executed by a processor, perform a method comprising:

obtaining an untrusted device driver, wherein the untrusted device driver is a set of executable instructions;

determining a set of computing resources required for execution of the set of executable instructions of the untrusted device driver, wherein the determining act comprises obtaining a processor-readable manifest associated with the untrusted device driver, the device-driver manifest specifying the set of computing resources required for execution of the set of executable instructions of the untrusted device driver, the set of computing resources selected from a group consisting of a hardware resource, a memory, an input/output port, an interrupt request line, and an inter-process communication channel; and providing one or more trusted local-access objects for use by the untrusted device driver for access to the required set of computing resources, the one or more trusted local-access objects being exclusive gateways that provide the only means of access to the required set of computing resources for the untrusted device driver, wherein the providing act, in response to the determining act, comprises generating one or more trusted local-access objects for use by the untrusted device driver for access to at least one computing resource of the required set of computing resources, the one or more trusted local-access objects being provided by an operating system and comprising executable instructions, wherein the generating of the one or more trusted local-access objects for access to at least one particular computing resource comprises:
- obtaining a set of executable instructions associated with the at least one particular computing resource;
- providing access for the untrusted device driver to the obtained set of executable instructions that is associated with the at least one particular computing resource; and
- initiating execution of the set of executable instructions of the untrusted device driver and the executable instructions of the one or more trusted local-access objects.

2. The computer storage device as recited in claim 1, wherein the method further comprises confirming that the device driver is authorized to access the required set of computing resources.

3. The computer storage device as recited in claim 1, wherein the set of executable instructions associated with the particular computing resource is provided by an operating system.

4. The computer storage device as recited in claim 1, wherein the method further comprises providing an operating system.

5. A computer storage device having processor-executable instructions that, when executed by a processor, perform a method comprising:
- obtaining an untrusted device driver comprising a set of executable instructions and the untrusted device driver being configured to access one or more computing resources;
- before the set of executable instructions of the untrusted device driver are executed, determining one or more target computing resources that the untrusted device driver will seek to access when the set of executable instructions of the device driver are executed;
- providing one or more trusted local-access objects to the untrusted device driver so that the untrusted device driver gains access to the one or more target computing resources via the provided one or more trusted local-access objects, the trusted local access objects comprising a set of executable instructions having one or more data structures that provide an exclusive gateway to one or more target computing resources; and
- wherein each of the trusted local-access objects are associated with one or more computing resources and the method further comprises restricting access of the untrusted device driver to the one or more target computing resources and such restricted access occurs only via the one or more trusted local-access objects associated with the associated one or more target computing resources.

6. The computer storage device as recited in claim 5, wherein the method further comprises confirming that the untrusted device driver is authorized to access the one or more target computing resources.

7. The computer storage device as recited in claim 5, wherein each of the trusted local-access objects are associated with one or more computing resources.

8. The computer storage device as recited in claim 5, wherein the computing resources are selected from a group consisting of a hardware resource, memory, input/output port, interrupt request line, and inter-process communication channel.

9. The computer storage device as recited in claim 5, wherein the method further comprises initiating execution of the executable instructions of the one or more of the untrusted device driver.

10. The computer storage device as recited in claim 5, wherein the method further comprises providing an operating system.

11. A computer storage device having processor-executable instructions that, when executed by a processor, perform a method comprising:
- obtaining an untrusted program module comprising a set of executable instructions and the untrusted program module being configured to access one or more computing resources;
- before the set of executable instructions of the untrusted program module are executed, determining one or more target computing resources of the untrusted program module, wherein the one or more target computing resources are computing resources that the untrusted program module will seek to access when the set of executable instructions of the program module are executed;
- providing one or more trusted local-access objects to the untrusted program module so that the untrusted program module gains access to the one or more target computing resources via the provided one or more trusted local-access objects, the one or more trusted local-access objects comprising a set of executable instructions having one or more data structures that provide an exclusive gateway to the one or more target computing resources;
- permitting the program module to access the one or more target computing resources only via the one or more trusted local-access objects;
- preventing installation of the untrusted program module due to conflicts with another untrusted program module currently accessing one or more target computing resources via the one or more local-access;
- preventing startup of the untrusted program module upon failure to access one or more target computing resources because the one or more target computing resources is already allocated to another program module;
- preventing access to one or more computing resources that are not specified in the set of target computing resources required for execution of the set of executable instructions of the untrusted program module; and
- permitting stopping and restarting of the untrusted program module via the one or more local-access objects, while an operational operating system remains operational.

12. The computer storage device as recited in claim 11, wherein the method further comprises confirming that the program module is authorized to access the one or more target computing resources.

13. The computer storage device as recited in claim 11, wherein the untrusted program module is a device driver.

* * * * *

UNITED STATES PATENT AND TRADEMARK OFFICE
CERTIFICATE OF CORRECTION

PATENT NO. : 8,074,231 B2  
APPLICATION NO. : 11/428096  
DATED : December 6, 2011  
INVENTOR(S) : Galen C. Hunt et al.

Page 1 of 1

It is certified that error appears in the above-identified patent and that said Letters Patent is hereby corrected as shown below:

On the Title Page, change item (75), line 9, "Bjame Steensgaard" to – "Bjarne Steensgaard".

In column 16, line 33, after "networks," insert -- and/or a --.

Signed and Sealed this  
Thirty-first Day of January, 2012

David J. Kappos  
*Director of the United States Patent and Trademark Office*